US010750317B2

(12) United States Patent
Imes

(10) Patent No.: US 10,750,317 B2
(45) Date of Patent: Aug. 18, 2020

(54) MOBILE APPLICATION AND SYSTEM FOR ASSOCIATING ACTIONS WITH INDEPENDENT GEOGRAPHIC LOCATIONS

(71) Applicant: Kevin R. Imes, Austin, TX (US)

(72) Inventor: Kevin R. Imes, Austin, TX (US)

( * ) Notice: Subject to any disclaimer, the term of this patent is extended or adjusted under 35 U.S.C. 154(b) by 0 days.

(21) Appl. No.: 16/525,994

(22) Filed: Jul. 30, 2019

(65) Prior Publication Data

US 2019/0357007 A1 Nov. 21, 2019

Related U.S. Application Data

(63) Continuation of application No. 15/918,996, filed on Mar. 12, 2018, now Pat. No. 10,405,137.

(60) Provisional application No. 62/470,765, filed on Mar. 13, 2017.

(51) Int. Cl.

| | |
|---|---|
| H04W 24/00 | (2009.01) |
| H04W 4/021 | (2018.01) |
| G06F 3/0484 | (2013.01) |
| H04W 12/06 | (2009.01) |
| G08G 1/0968 | (2006.01) |
| H04W 88/02 | (2009.01) |
| H04M 1/725 | (2006.01) |
| G01C 21/34 | (2006.01) |

(52) U.S. Cl.
CPC ........ *H04W 4/022* (2013.01); *G06F 3/04842* (2013.01); *H04W 12/06* (2013.01); *G01C 21/3492* (2013.01); *G08G 1/096827* (2013.01); *H04M 1/72519* (2013.01); *H04M 1/72522* (2013.01); *H04W 88/02* (2013.01)

(58) Field of Classification Search
CPC ......... G01C 21/3492; G08G 1/096827; G08G 1/096844; H04L 67/18; H04L 4/028; H04L 51/32; H04L 67/22; H04W 4/023; H04W 64/00; H04W 4/02; H04W 1/72519; H04W 1/72522; H04W 88/02; H04M 1/72519; H04M 1/72522
USPC .................................. 455/456.1, 456.6, 418
See application file for complete search history.

(56) References Cited

U.S. PATENT DOCUMENTS

| | | | |
|---|---|---|---|
| 9,432,044 B1 * | 8/2016 | Lee ..................... | H03M 1/1061 |
| 9,817,948 B2 | 11/2017 | Swank | |
| 2015/0088622 A1 | 3/2015 | Ganschow | |
| 2015/0095355 A1 * | 4/2015 | Patton ..................... | G06F 16/29 |
| | | | 707/754 |

(Continued)

*Primary Examiner* — Danh C Le
(74) *Attorney, Agent, or Firm* — Dickinson Wright, PLLC

(57) ABSTRACT

A mobile application executable on at least one mobile device for associating actions with a plurality of independent geographic locations and a system for implementing the actions are provided. The system and mobile application carry out a method including the steps of configuring a graphical user interface to include a map and requesting the user to select a designated pin location. The system includes a main controller configured to communicate with the at least one mobile device and initiate the actions based on the location of the at least one mobile device relative to the plurality of independent geographic locations. At least one database is in communication with the main controller and accessible to the mobile and away services module for storing data related to the actions associated with the plurality of independent geographic locations and the at least one mobile device.

20 Claims, 6 Drawing Sheets

(56) References Cited

U.S. PATENT DOCUMENTS

| | | | |
|---|---|---|---|
| 2015/0206349 A1* | 7/2015 | Rosenthal | H04N 21/41407 |
| | | | 345/633 |
| 2015/0281889 A1* | 10/2015 | Menendez | H04W 4/021 |
| | | | 455/456.1 |
| 2016/0109954 A1 | 4/2016 | Harris et al. | |
| 2016/0140672 A1 | 5/2016 | Shnitzer et al. | |
| 2016/0171238 A1* | 6/2016 | Sibillo | G06F 21/6227 |
| | | | 713/164 |
| 2016/0219401 A1* | 7/2016 | Segev | H04W 4/021 |
| 2016/0262424 A1* | 9/2016 | Mikkelsen | A23C 9/1307 |
| 2016/0309310 A1 | 10/2016 | Herman et al. | |
| 2017/0034659 A1 | 2/2017 | Shnitzer et al. | |
| 2017/0048670 A1* | 2/2017 | Weik | G06F 16/487 |
| 2017/0140478 A1* | 5/2017 | Freeman | G06Q 50/02 |
| 2017/0171704 A1* | 6/2017 | Frenz | H04W 4/021 |
| 2017/0315979 A1 | 11/2017 | Boucher et al. | |
| 2018/0150868 A1 | 5/2018 | Stone et al. | |
| 2018/0176166 A1 | 6/2018 | Philipson | |
| 2018/0191596 A1 | 7/2018 | Bhaya et al. | |
| 2019/0173823 A1* | 6/2019 | Mukherjee | H04L 51/20 |

\* cited by examiner

MOBILE APPLICATION AND SYSTEM FOR ASSOCIATING ACTIONS WITH INDEPENDENT GEOGRAPHIC LOCATIONS

CROSS-REFERENCE TO RELATED APPLICATIONS

This continuation patent application claims the benefit of U.S. Utility application Ser. No. 15/918,996 entitled "Mobile Application and System for Associating Actions with Independent Geographic Locations", filed Mar. 12, 2018, which claims the benefit of U.S. Provisional Application No. 62/470,765 entitled "Mobile Application and System for Associating Actions with Independent Geographic Locations" filed Mar. 13, 2017. The entire disclosures of the above applications are incorporated herein by reference.

FIELD

The present disclosure relates to a mobile application for associating actions with independent geographic locations. The present disclosure also relates to a system for implementing the actions associated with the independent geographic locations and a mobile device for interacting with the system.

BACKGROUND

This section provides a general summary of background information and the comments and examples provided in this section are not necessarily prior art to the present disclosure.

Automation devices are increasingly employed in residential and commercial buildings and can include control of systems in the building such as heating, ventilation, and air conditioning (HVAC) systems, security, or lighting systems, for example. Such automation devices may also have the capability to interact with a mobile application executed by a mobile device (e.g., smart phone) to monitor and/or control devices within the building. The automation devices can also take into account the location of a user relative to or within the building to determine which settings or modes the automation devices utilize (e.g., to save energy). The automation devices may also be connected to a central hub or control unit within the building.

Additionally, voice control devices, such as hands-free voice speakers (e.g., Amazon Echo®) are available that provide for voice interaction with a voice service provider to initiate various actions or tasks (e.g., ordering a pizza). Usually, such voice control devices are placed in and used within a home or business. In other cases, the voice control devices can be portable (e.g., Amazon Tap®). In either case, the voice control devices receive a voice command from a user and that command is then processed by a voice service provider. The voice control devices may also provide for interaction with automation devices to allow a user to command various automation tasks to occur in response to his or her voice command (e.g., order goods and services, command to turn on lights, or adjust a thermostat setpoint).

Automation devices can prove useful for control of actions in a home or business and can provide many benefits, such as convenience and energy savings. While voice control devices can provide for voice commands that can be used to initiate tasks or actions both inside and outside the home or business, automation devices are generally limited to tasks and control within the building itself. Yet, currently available automation devices and voice control devices do not address needs for providing for automatic control and actions associated with a specific geographic area or scheduled events. Accordingly, there is an increasing need for solutions to conveniently facilitate control of actions dependent upon geographic areas and/or events.

SUMMARY

This section provides a general summary of the inventive concepts associated with the present disclosure and is not intended to represent a comprehensive disclosure of its full scope or all of its features, object, aspects and advantages.

An aspect of the present disclosure may be to provide a system including a main controller that can be configured to communicate with at least one mobile device and may initiate actions associated with a plurality of independent geographic locations based on the location of the at least one mobile device relative to the plurality of independent geographic locations. A mobile and away services module can be in communication with the main controller for initiating and controlling actions associated with the plurality of independent geographic locations. At least one database may be in communication with the main controller and accessible to the mobile and away services module for storing data related to the actions associated with the plurality of independent geographic locations and the at least one mobile device.

Another aspect of the present disclosure may be to provide a mobile application including program instructions tangibly stored on a computer-readable medium and operable when executed to cause a mobile device to perform a method of associating actions with independent geographic locations. The method of the mobile application may include the step of setting up at least one independent geofence with an associated voice instruction about a selected geographic location. The method can also include monitoring the location of the mobile device relative to the at least one independent geofence and detecting the at least one mobile device crossing the at least one independent geofence. Finally, the method may conclude by initiating communication of the associated voice instruction from the main controller to a voice services provider in response to the detection of the crossing of the independent geofence.

Yet another aspect of the present disclosure can be to provide a mobile application including program instructions tangibly stored on a computer-readable medium and operable when executed to cause a mobile device to perform a method of associating actions with independent geographic locations. The method of the mobile application may include the step of providing a graphical user interface on the mobile device to interact with a user. The method can then include the step of receiving a user input corresponding to the at least one action to be associated with the pin. The method can continue with the step of monitoring the location of the mobile device. The method may conclude by initiating implementation of the at least one action based on the location of the mobile device relative to the location of the pin.

Further areas of applicability will become apparent from the detailed written description provided herein. The description and specific examples provided in this summary section are intended for purposes of illustration only and are not intended to limit the scope of the present disclosure.

DRAWINGS

The drawings described herein are for illustrative purposes only of selected embodiments, and are not intended to limit the present disclosure to only that actually shown. With this in mind, various features and advantages of example embodiments of the present disclosure will become apparent from the written description when considered in combination with the appended Figures, wherein.

DETAILED DESCRIPTION

Figure 1:
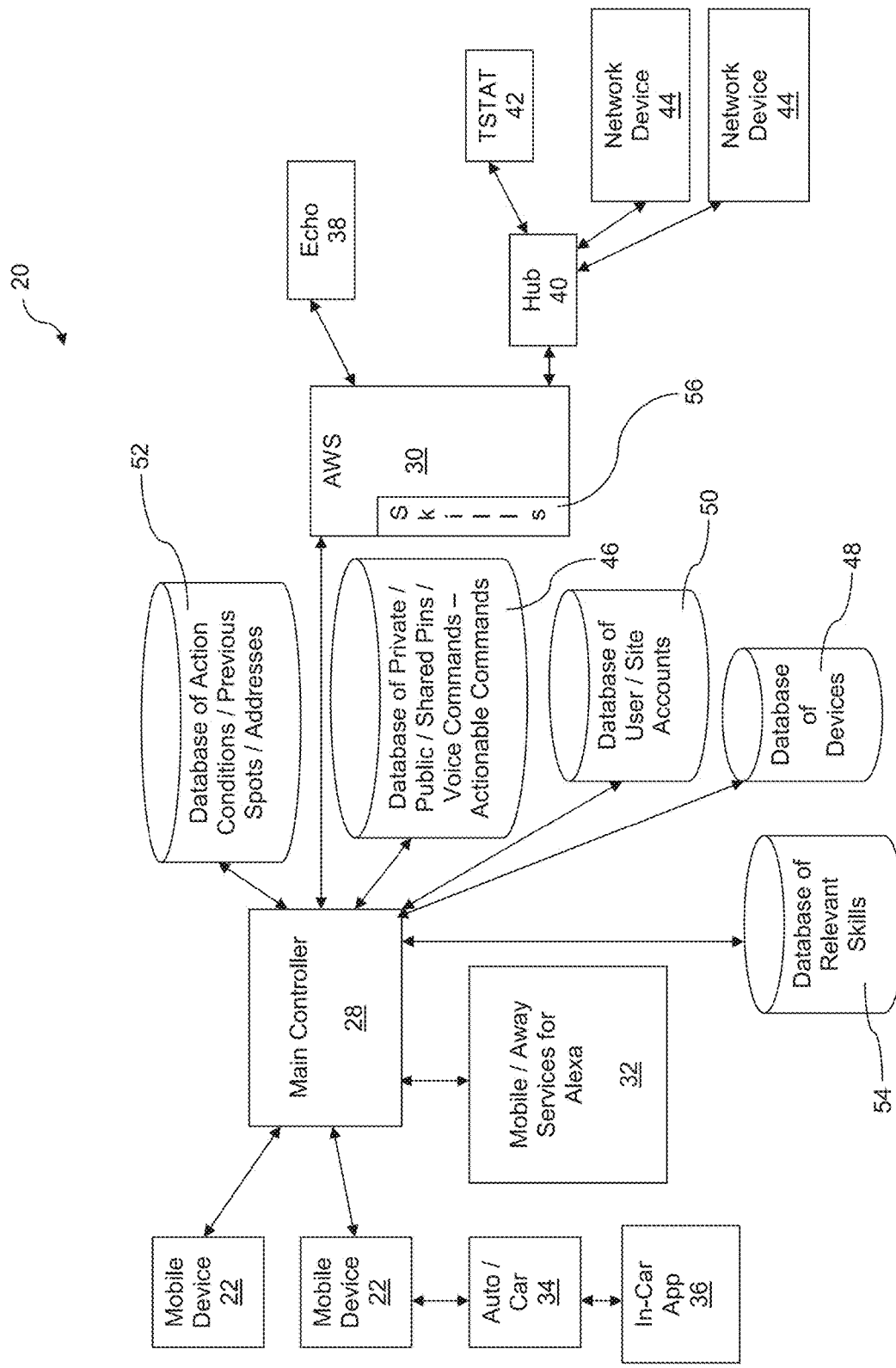
FIG. 1 is a block diagram of a system for implementing actions associated with independent geographic locations according to aspects of the disclosure.

Referring to the Figures, wherein like numerals indicate corresponding parts throughout the several views, a system 20 and mobile application in accordance with aspects of the disclosure is provided. The system 20 can interact with at least one mobile device 22 executing the mobile application for implementing actions associated with independent geographic locations. The mobile application can include instructions tangibly stored on a computer-readable medium and operable when executed to cause the mobile device 22 to perform a method for associating actions with independent geographic locations. As discussed in more detail below, the system 20 and mobile application may allow a user to "drop" pins 24 or markers onto a virtual map or map view 26 in any location in order to create independent geofences around each pin 24. The pins 24 can represent any location, intersection, or coordinates.

The system 20 for implementing the actions associated with the independent geographic locations is best shown in FIG. 1. The system 20 can include a main controller 28 configured to communicate with a voice services provider 30 and the at least one mobile device 22. The system 20 can also include a mobile and away services module 32 in communication with the main controller 28 for initiating and controlling actions associated with a geographic location. According to an aspect, the at least one mobile device 22 can also be in communication with a motor vehicle 34 that may operate an in-car app 36.

The main controller 28 may have any combination of memory storage such as random-access memory (RAM) or read-only memory (ROM), processing resources or a microcontroller or central processing unit (CPU) or hardware or software control logic to enable implementation of the actions associated with the independent geographic locations. Additionally, the main controller 28 may include one or more wireless, wired or any combination thereof of communications ports to communicate with external resources as well as various input and output (I/O) devices, such as a keyboard, a mouse, pointers, touch controllers, and display devices. The main controller 28 may also include one or more buses operable to transmit communication of management information between the various hardware components, and can communicate using wire-line communication data buses, wireless network communication, or any combination thereof.

The voice services provider 30 can communicate with a hands-free voice speaker 38 and a hub 40 coupled with a thermostat 42 and a plurality of network devices 44, all of which may be located in a home or business, for example. According to an aspect of the disclosure, the voice services provider 30 can be Alexa Voice Services (AVS) and/or Amazon Web Services® (AWS®), for example. However, it should be understood that other voice services providers 30 can be utilized including, but not limited to those provided by Apple® and/or Google®. It should also be understood that although voice services providers may be utilized, direct engagement with service providers (e.g., directly communicate with Domino's Pizza®) can also be realized in place of implementation of actions through the voice services provider 30.

The main controller 28 can also be in communication with at least one database. According to an aspect, a plurality of databases 46, 48, 50, 52, 54 may be used. While the databases 46, 48, 50, 52, 54 may be separate from the main controller 28 as shown in FIG. 1, it should be understood that the databases 46, 48, 50, 52, 54 may be part of the main controller 28 itself. Additionally, any number of databases 46, 48, 50, 52, 54 may be utilized. The databases 46, 48, 50, 52, 54 can include a first database 46 that may be in communication with the main controller 28 for storing private pins 24 and public pins 24 and shared pins 24 and voice commands. Thus, the pins 24 and associated actions can be shared by family members, for example. Similarly, a second database 48 in communication with the main controller 28 can be used for storing data associated with the at least one mobile device 22 such as, but not limited to data regarding a related personal computer, smart phone, cellular or mobile phone, or any combination thereof. A third database 50 can also be in communication with the main controller 28 for storing user accounts and site accounts. Additionally, according to an aspect of the disclosure, a public pin library can be provided which allows members of the general public to share pins 24, as well. Through the public pin library, users can submit or upload their pins 24 and can also download pins 24 that others have created. A fourth database 52 can also be in communication with the main controller 28 for storing action conditions and previous spots and addresses. For instance, a user may want to store favorite addresses or locations that they frequently visit or that they would like to remember and/or use as a location for a pin 24 in the future.

According to an aspect, the voice services provider 30 (e.g., Alexa Voice Services) provides a skill API 56 (Application Programming Interface) that allows for voice interaction between the main controller 28 and the voice services provider 30. Skills (i.e., abilities provided by the voice services provider 30, such as adjusting lights) associated with the skill API 56 can be stored in a fifth database 54 in communication with the main controller 28.

Figure 2:
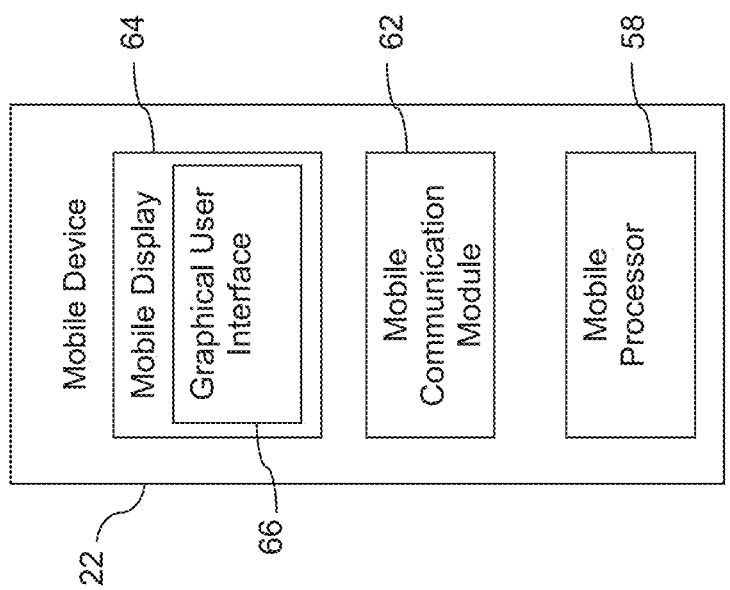
FIG. 2 is a block diagram of a mobile device for executing a mobile application.

As best shown in FIG. 2, the mobile device 22 can include a mobile processor 58 for executing the mobile application and configured to set up at least one independent geofence 60 (FIG. 3) with an associated voice instruction about a selected geographic location. The mobile application of the mobile device 22 can also be configured to monitor the location of the mobile device 22 relative to the at least one independent geofence 60 and detect the mobile device 22 crossing the at least one independent geofence 60. Finally, the mobile application of the mobile device 22 may also be configured to initiate communication of the associated voice instruction to the voice service provider 30 in response to the detection of the crossing of the independent geofence 60.

In order to enable wireless communication with the main controller 28, the mobile device 22 can additionally include a mobile communication module 62 for communicating with the main controller 28. The mobile application may therefore be configured to communicate the location of the mobile device 22, user inputs, and associated voice instructions to the main controller 28 using the mobile communication module 62. More specifically, the communication between the mobile device 22 and the main controller 28 can take many forms, such as, but not limited to text messages.

As used herein, the wireless communication technology can include various types and variants of wireless communication configurable to facilitate wireless communication, including associated protocols or enhancements thereto including, but not limited to, any combination or portion of, IEEE 802.15-based wireless communication, Zigbee communication, INSETEON communication, X10 communication protocol, Z-Wave communication, Bluetooth communication, WIFI® communication or IEEE 802.11-based communication (hereinafter referred to as "WIFI"), WiMAX communication, IEEE 802.16-based communication, various proprietary wireless communications, or any combination thereof.

Furthermore, devices or modules that are in communication with one another need not be in continuous communication with each other unless expressly specified otherwise. In addition, devices or modules that are in communication with one another may communicate directly or indirectly through one or more intermediaries. A communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a module, a piece of hardware, software, firmware, middleware, another component of a computing system, or any combination thereof.

As described herein, the mobile device 22 can include devices such as, but not limited to a personal computer, a PDA, a consumer electronic device, a media device, a smart phone, a cellular, mobile phone, or any combination thereof. The mobile device 22 can have a storage memory configured to maintain the mobile application. The mobile device 22 can also include a mobile display 64 presenting a graphical user interface 66 for interacting with the user. The mobile device 22 may include a mobile communication module 62 for communicating with main controller 28.

According to an aspect, each network device 44 can comprise an automation unit operatively coupled to equipment at the site, such as lights and/or locks. The at least one network device 44 can include any combination of a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system.

The mobile application may be a native application executed on the mobile device 22, which could operate using an operating system such as, but not limited to Android™, iOS™, and Windows® Phone. The mobile application may be downloadable from an app store such as the iTunes™ App Store, Google Play Store™, or directly from a manufacturer web site, for example.

Figure 4A:
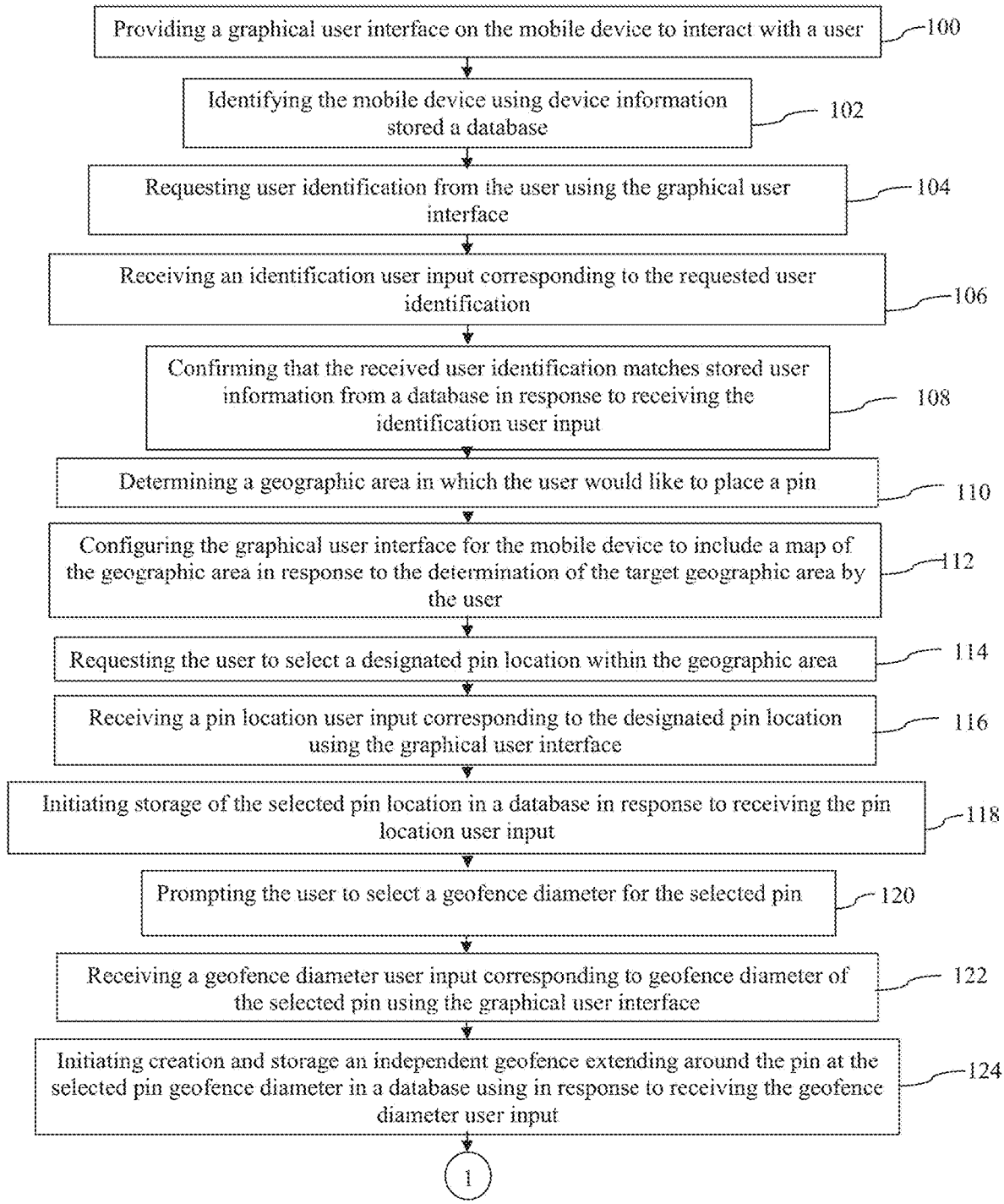
FIGS. 4A and 4B illustrate a flowchart of a method for associating actions with independent geographic locations carried out by program instructions of the mobile application in accordance with aspects of the disclosure.
Figure 4B:
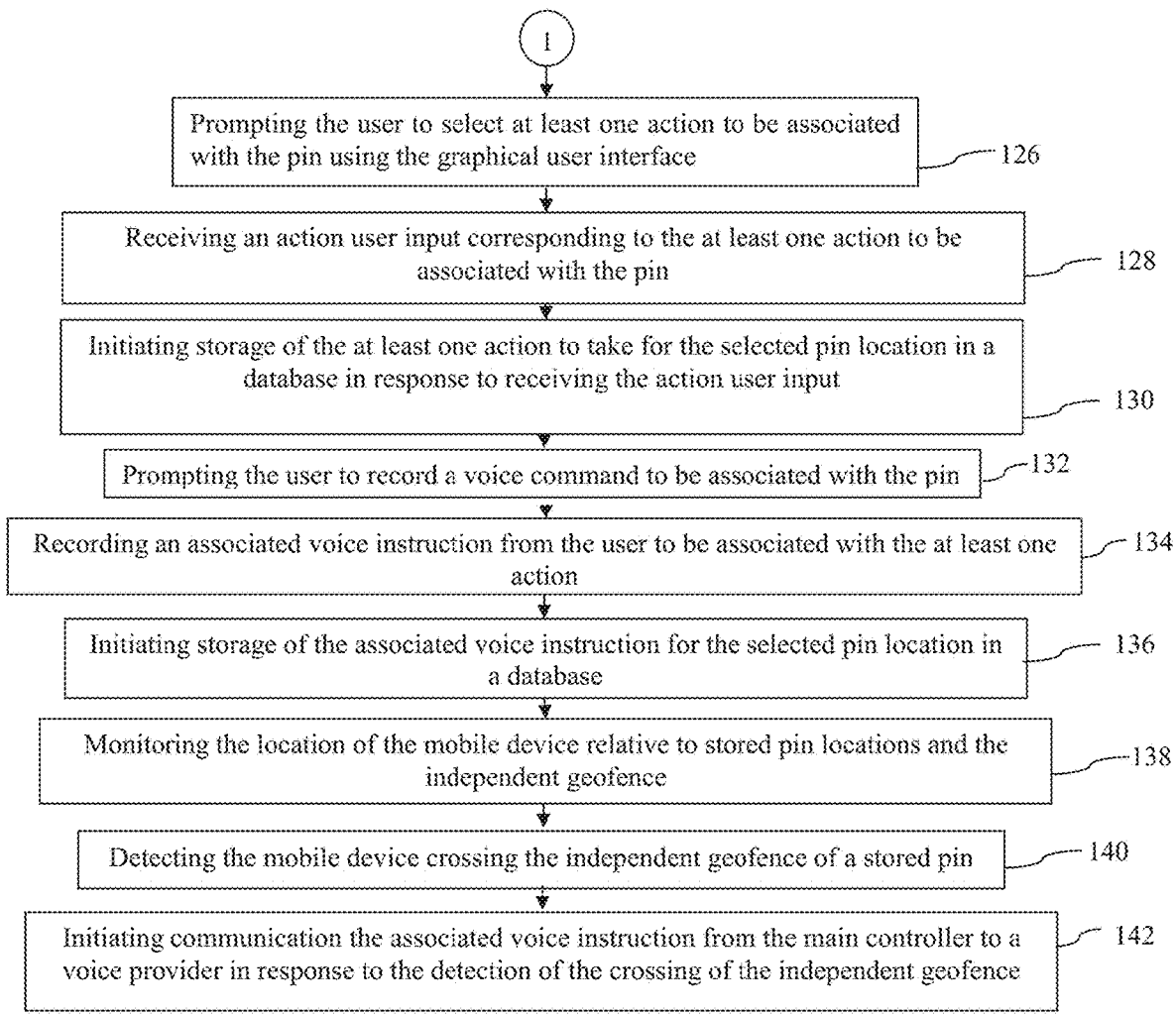
Figure 5:
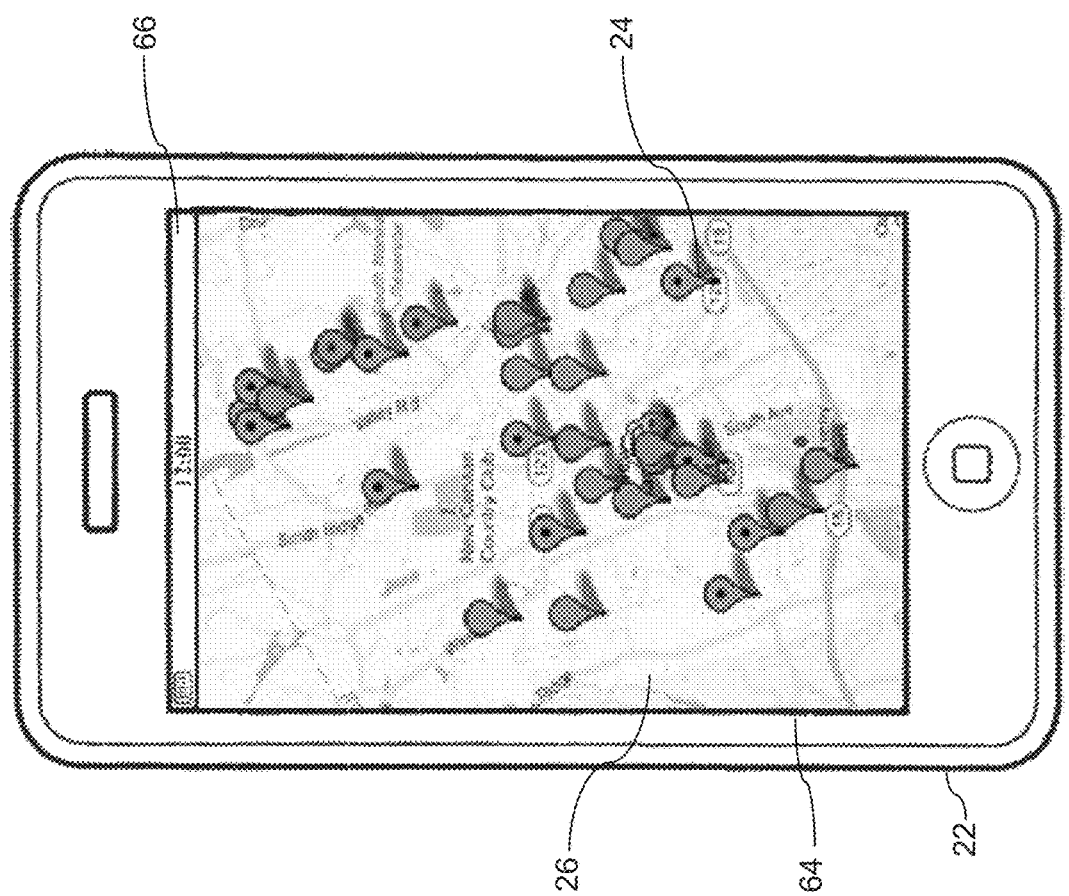
FIG. 5 illustrates the mobile device of FIG. 2 having a graphical user interface in accordance with aspects of the disclosure.

As best shown in FIGS. 4A and 4B, a method carried out by the system and mobile application can include the step of 100 providing a graphical user interface 66 on the mobile device 22 to interact with a user. An example of the graphical user interface 66 is shown in FIG. 5. The system 20 can then initiate 102 identifying the mobile device 22 using device information stored in a database (e.g., using the main controller 28 and data stored within the second database 48). The system 20 may then put into effect 104 requesting user identification from the user using the graphical user interface 66. It should be appreciated that while the request for user identification can be carried out utilizing a username and password, for example, the system 20 and mobile application could instead identify the user using other identification, such as, but not limited to biometric identification. Then, 106 receiving an identification user input corresponding to the requested user identification. The system 20 can then proceed with 108 confirming that the received user identification matches stored user information from a database (e.g., the main controller 28 can compare the received user identification with data stored in the third database 50) in response to receiving the identification user input.

The method carried out by the system 20 and mobile application may include 110 determining a geographic area in which the user would like to place a pin 24. For example, the mobile application could request that the user provide geographic coordinates and/or request an address or intersection that is nearby a desired position in which to place a pin 24. The mobile application may be used for 112 configuring the graphical user interface 66 for the mobile device 22 to include a map of the geographic area in response to the determination of the target geographic area by the user. In more detail, the mobile application can provide a map view 26 that allows the user to select a specific location in which to place a pin 24. Such a map view 26, according to aspects of the disclosure, is best shown in FIG. 5. The system 20 and mobile application can proceed with 114 requesting the user to select a designated pin location within the geographic area and 116 receiving a pin location user input corresponding to the designated pin location using the graphical user interface 66. For example, the user can utilize the graphical user interface 66 to drag or scroll the map view 26 to a desired position. Next, 118 initiating storage of the selected pin location in a database 38 (e.g., first database 46 using the main controller 28) in response to receiving the pin location user input.

The system 20 and mobile application can continue by, 120 prompting the user to select a geofence diameter 68 for the selected pin 24. It should be appreciated that any geofence diameter 68 may be used, including zero (i.e., no geofence 60). The next step of the method may be 122 receiving a geofence diameter user input corresponding to geofence diameter 68 of the selected pin 24 using the graphical user interface 66. Then, the system 20 can implement 124 initiating creation and storage of an independent geofence 60 extending around the pin 24 at the selected pin geofence diameter 68 in a database (e.g., the first database 46 using the main controller 28) in response to receiving the geofence diameter user input.

The method carried out by the system 20 and mobile application may include 126 prompting the user to select at least one action to be associated with the pin 24 using the graphical user interface 66. For example, the mobile application may provide for a drop down menu or provide a predefined template for an action with the graphical user interface 66 and then allow the user to choose the action. The system 20 and mobile application proceed with 128 receiving an action user input corresponding to the at least one action to be associated with the pin 24. Any type of action may be associated with the pin 24, such as but not limited to sending email or text messages, making phone calls automatically, home automation, purchasing goods and/or services. The next step can be 130 initiating storage of the at least one action to take for the selected pin location in a database (e.g., the fourth database 52 using the main controller 28) in response to receiving the action user input. Therefore, the actions can be customized on a user-by-user basis.

The method carried out by the system 20 and mobile application can then continue with the steps of 132 prompting the user to record a voice command to be associated with the pin 24 and 134 recording an associated voice instruction from the user to be associated with the at least one action. In other words, after placing the pin 24 and associating an action, the mobile application requests that the user records a voice instruction or command just as he or she would do with the hands-free voice speaker 38 that communicates with the voice services provider 30. The method can then include the step of 136 initiating storage of the associated voice instruction for the selected pin 24 location in a database (e.g., the first database 46 using the main controller 28).

Figure 3:
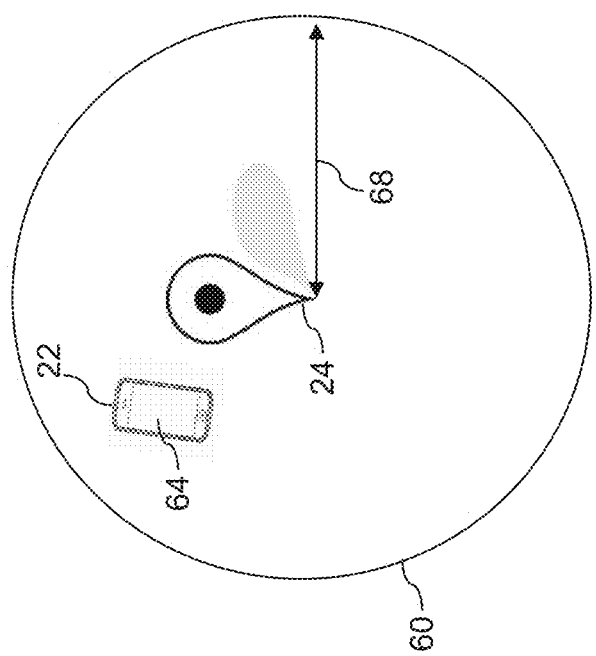
FIG. 3 illustrates an independent geofence about a pin and the mobile device of FIG. 2 inside the geofence according to aspects of the disclosure.

The method can also include the step of 138 monitoring the location of the mobile device 22 relative to stored pin locations and the independent geofence 60. Next, 140 detecting the mobile device 22 crossing the independent geofence 60 of a stored pin 24 (FIG. 3). Geofences 60 can be useful due to limitations in location detection of mobile devices 22. For example, a mobile device 22 may only be capable of location detection within a specific distance. Therefore, to avoid erroneous detection of the mobile device 22 with respect to the pin 24, the independent geofence 60 allows for some margin or error in the location detection of the mobile device 22. The method may conclude by 142 initiating communication of the associated voice instruction from the main controller 28 to a voice services provider 30 in response to the detection of the crossing of the independent geofence 60. So, in comparison to voice commands sent to the voice services provider 30 by a hands-free voice speaker 38 (i.e., from an Amazon Echo® device to Alexa Voice Services®), the voice instruction may be stored on the main controller 28 and sent from the main controller 28 to the voice services provider 30. Because the voice instructions can be stored on the main controller 28, for example, and reused many times, the user is conveniently prevented from being required to provide a new voice instruction each time. While the actions can be automatic upon the mobile device 22 crossing the the independent geofence 60 of a stored pin 24, it should be understood that the system and mobile application may alternatively request confirmation from the user that the action should be carried out, for example.

Obviously, many modifications and variations of the present invention are possible in light of the above teachings and may be practiced otherwise than as specifically described while within the scope of the appended claims. To the extent that it is operationally feasible, embodiments of the disclosure described herein may include any of the features identified above in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

What is claimed is:

1. An application including program instructions tangibly stored on a non-transitory computer-readable medium and operable when executed to cause a system to perform a method of associating at least one action with independent geographic locations comprising:
   prompting a first user to select a designated pin location of a pin and a geofence distance for at least one independent geofence corresponding to the pin;
   receiving a pin location user input corresponding to the designated pin location and a geofence distance user input corresponding to the geofence distance;
   monitoring the location of a mobile device of the system associated with a second user relative to the at least one independent geofence;
   detecting the mobile device crossing the at least one independent geofence; and
   initiating implementation of the at least one action in response to the detection of the mobile device crossing the at least one independent geofence.

2. The application as set forth in claim 1, wherein the step of monitoring the location of a mobile device of the system associated with a second user relative to the at least one independent geofence includes the step of communicating the location of the mobile device with a main controller of the system via at least one of Bluetooth communication and WIFI communication.

3. The application as set forth in claim 1, further including the step of identifying the mobile device associated with the second user using device information stored in a database.

4. The application as set forth in claim 1, further including the steps of:
   providing a graphical user interface to interact with the first user; and
   providing a map view that allows the first user to select the designated pin location of the pin and the geofence distance for the at least one independent geofence.

5. The application as set forth in claim 1, further including the step of requesting confirmation from at least one of the first user and the second user that the at least one action should be carried out.

6. The application as set forth in claim 1, further including the steps of:
   uploading the pin created by the first user to a database of the system; and
   downloading the pin created by the first user from the database onto the mobile device associated with the second user.

7. The application as set forth in claim 1, wherein the method further includes the steps of:
   requesting user identification from the second user;
   receiving an identification user input corresponding to the requested user identification; and
   confirming that the received user identification matches stored user information in response to receiving the identification user input.

8. A system comprising:
   a user interface configured to prompt and receive a pin location user input corresponding to a designated pin location of a pin, a geofence distance user input corresponding to a geofence distance for at least one independent geofence corresponding to the pin, and an action user input corresponding to at least one action corresponding to the designated pin location of the pin from a first user;
   a mobile device associated with a second user configured to monitor a location of the mobile device relative to the to the at least one independent geofence;
   a main controller in communication with the user interface and the mobile device and configured to:
      detect the mobile device crossing the at least one independent geofence, and
      initiate implementation of the at least one action in response to the detection of the mobile device crossing the at least one independent geofence.

9. The system as set forth in claim 8, further including at least one database in communication with said main controller for storing data related to the actions associated with the designated pin location of the pin and the at least one mobile device.

10. The system as set forth in claim 9, wherein said at least one database includes:
   a first database in communication with said main controller for storing private pins and public pins and shared pins and voice commands;
   a second database in communication with said main controller for storing data associated with said mobile device;
   a third database in communication with said main controller for storing user accounts and site accounts; and a fourth database in communication with said main controller for storing action conditions and previous spots and addresses.

11. The system as set forth in claim 8, wherein said mobile device and said main controller are configured to communicate with one another using at least one of Bluetooth communication and WIFI communication.

12. The system as set forth in claim 8, wherein said mobile device and said main controller are configured to communicate with one another using text messages.

13. A method of associating at least one action with independent geographic locations comprising the steps of:
prompting a first user to select a designated pin location of a pin and a geofence distance for at least one independent geofence corresponding to the pin and at least one action corresponding to the designated pin location of the pin;
receiving a pin location user input corresponding to the designated pin location and a geofence distance user input corresponding to the geofence distance and an action user input corresponding to the at least one action from the first user;
monitoring the location of a mobile device of the system associated with a second user relative to the at least one independent geofence;
detecting the mobile device crossing the at least one independent geofence; and
initiating implementation of the at least one action in response to the detection of the mobile device crossing the at least one independent geofence.

14. The method as set forth in claim 13, further including the steps of:
determining a geographic area in which the first user would like to place the pin associated with the at least one independent geofence;
configuring a graphical user interface to include a map view of the geographic area in response to the determination of the target geographic area by the first user.

15. The method as set forth in claim 13, further including the steps of:
requesting user identification from the second user;
receiving an identification user input corresponding to the requested user identification; and
confirming that the received user identification matches stored user information in response to receiving the identification user input.

16. The method as set forth in claim 13, further including the step of initiating storage of the designated pin location in a database in response to receiving the pin location user input.

17. The method as set forth in claim 13, further including the step of initiating creation and storage of the at least one independent geofence extending around the pin at the pin geofence distance in a database in response to receiving the geofence distance user input.

18. The method as set forth in claim 13, further including the steps of:
uploading the pin to a public pin library; and
sharing the pin in the public pin library with other users.

19. The method as set forth in claim 18, further including the step of downloading the pin from the public pin library that another user has created.

20. The method as set forth in claim 13, further including the steps of:
storing a favorite location; and
using the favorite location as the designated pin location for the pin.

* * * * *